(12) United States Patent
Tellenbach

(10) Patent No.: US 6,552,280 B1
(45) Date of Patent: Apr. 22, 2003

(54) SURFACE-HARDENED AUSTENITIC STAINLESS STEEL PRECISION WEIGHT AND PROCESS OF MAKING SAME

(75) Inventor: Jean-Maurice Tellenbach, Hettlingen (CH)

(73) Assignee: Mettler-Toledo GmbH, Greifensee (CH)

( * ) Notice: Subject to any disclaimer, the term of this patent is extended or adjusted under 35 U.S.C. 154(b) by 51 days.

(21) Appl. No.: 09/665,799

(22) Filed: Sep. 20, 2000

(51) Int. Cl.$^7$ ............................ G01G 23/01; C23C 8/22
(52) U.S. Cl. .................... 177/264; 73/1.13; 29/90.01; 148/210; 148/206; 148/225
(58) Field of Search .................... 177/264, 50; 73/1.13, 73/1.15; 148/206, 210, 218, 225; 29/90.01

(56) References Cited

U.S. PATENT DOCUMENTS

| | | | |
|---|---|---|---|
| 70,531 A | * 11/1867 | Comstock | 177/264 |
| 1,639,120 A | * 8/1927 | Weber | 177/264 |
| 1,766,466 A | * 6/1930 | Snelling | 177/264 |
| 1,878,009 A | * 9/1932 | Snelling | 177/264 |
| 4,836,315 A | * 6/1989 | Lee | 177/247 |
| 5,344,502 A | * 9/1994 | Mack et al. | 148/236 |
| 5,556,483 A | * 9/1996 | Tahara et al. | 148/206 |
| 5,593,510 A | * 1/1997 | Tahara et al. | 148/225 |
| 5,792,282 A | * 8/1998 | Tahara et al. | 148/206 |
| 6,238,490 B1 | * 5/2001 | Bell et al. | 148/222 |

FOREIGN PATENT DOCUMENTS

EP 0588458 3/1994
EP 0810296 12/1997

OTHER PUBLICATIONS

"Four Stainless Steel Weights" from the Picture Gallery of the English Weights and Measures website at http://home.clara.net/brianp/group2.html, one page, copyright 1997.*

"Stainless Steel" from the Encyclopedia Britannica Online at http://www.search.eb.com/bol/topic?eu=71169&sctn=1, two pages, copyright 1994.*

M.Plassa et al.: "Properties of Nobium Considered as a Possible Material for Mass Standards" Imeko–International Measurement Confederation . . . Sep. 5–8, 1995; pp. 29–34, Warszawa.

Stevenson P et al: "The Effect of Process Parameters on the Plasma Carbon Diffusion Treatment of Stainless . . . "; Surface and Coatings Technology, Elsevier, Amsterdam, NL, vol. 63, 1994 pp. 135–143; ISSN: 0257–8972.

Schwartz R et al: "Procedures for Cleaning Stainless Steel Weights, Investigating by . . . " Measurement Science and Technology, IOP Publishing, Bristol, GB, vol. 5, No. 12, Dec. 1, 1994, pp. 1429–1435.

* cited by examiner

Primary Examiner—Randy W. Gibson

(57) ABSTRACT

A precision weight (1) has greater permanence of mass due to a hardened surface layer that provides greater wear and scratch resistance as well as greater corrosion resistance. The hardened surface layer is a diffusion layer of increased carbon and/or nitrogen concentration resulting from a heat treatment under gas atmosphere.

19 Claims, 1 Drawing Sheet

SURFACE-HARDENED AUSTENITIC STAINLESS STEEL PRECISION WEIGHT AND PROCESS OF MAKING SAME

BACKGROUND OF THE INVENTION

The present invention relates to precision weights of the kind that are used
1. to calibrate and test weighing instruments and other kinds of measuring apparatus,
2. to calibrate and test other weights of a lower class of accuracy,
3. to weigh things on a weighing instrument, and/or
4. to perform measurements other than weighing with an apparatus employing at least one weight, e.g., to measure force, pressure, and other physical quantities.

Within the present context, the term "weight" means the physical embodiment of a defined quantity of mass in a solid, durable artifact such as a compact body of metal. Generally, the quantity of mass represented by a weight is known within a certain tolerance band, also called "maximum permissible error" (MPE). Based on their maximum permissible errors, weights are divided into accuracy classes according to official standards.

In the U.S., a commonly but not exclusively used standard for weights is ASTM. Standard E 617, "Standard Specification for Laboratory Weights and Precision Mass Standards". It covers weights from 1 milligram to 5000 kilograms and divides the weights into 8 classes according to a tolerance table. For example, a one-kilogram weight of the most accurate ASTM class (ASTM Class 0) has a tolerance of ±1.3 milligrams, while a one-kilogram weight in the least accurate class (ASTM Class 7) has a tolerance of ±470 milligrams.

On a worldwide basis, the authoritative standard for weights is OIML Recommendation 111, "Weights of classes $E_1$, $E_2$, $F_1$, $F_2$, $M_1$, $M_2$, $M_3$", published by Organisation Internationale de Métrologie Légale (OIML). It covers weights from 1 milligram to 50 kilograms and divides the weights into 7 classes according to a tolerance table. For example, a one-kilogram weight of the most accurate OIML class (OIML Class $E_1$) has a tolerance of ±0.5 milligrams, while a one-kilogram weight in the least accurate class (OIML Class $M_3$) has a tolerance of ±500 milligrams.

In addition to defining a class structure based on mass tolerances, both standards have requirements for the physical properties of weights, i.e., shape, construction, material, density, surface finish, provisions for fine adjustment, and identification markings.

Generally, the requirements on physical characteristics are more demanding for the more accurate weight classes. For example, a weight of ASTM Class 0 or one of the OIML Classes $E_1$, $E_2$:

must consist of a single, solid piece of material and cannot have a cavity where material could be added or removed for a calibration adjustment;
  must be adjusted by abrasion, grinding, electrolysis, or other appropriate surface-removal process (i.e., mass can only be removed, never added);
  must have a density of nominally 8000 kg/m$^3$ with only a narrow tolerance band (whereby materials other than steel are virtually excluded);
  must have a smooth surface finish (of a "glossy appearance" according to OIML R 111) and no significant scratches or other surface defects;
  must be corrosion-resistant;
  must have a hardness and resistance to wear that is similar or better than that of austenitic stainless steel; and
  must be practically non-magnetic (within a very small tolerance of magnetic susceptibility).

Austenitic stainless steels of the AISI (American Iron and Steel Institute) designations 316, 317, 318 or 321 or similar alloys are among the preferred materials for precision weights of the type that the present invention relates to. State-of-the-art weights made of one of these materials will meet the required material properties of density, corrosion resistance, hardness, and low magnetic susceptablilty, albeit that the resistance to wear will be only the minimum required, i.e., not better than that of austenitic stainless steel. Resistance to wear and corrosion, however, is tied directly to the permanence of the mass value of a weight, which is one of the most desirable properties, particularly with respect to weights in the highest classes of accuracy. The loss of mass due to surface wear over the course of a calibration interval of, e.g., one or two years, should be small in comparison to the maximum permissible error for the respective weight, in order to minimize the risk that weights that are used in critical applications could run out of tolerance at any time between calibrations. Also, as mentioned above, weights of the highest classes of accuracy can never be restored to a higher mass value, because adjustments can only be made by removing mass from the weight. Thus, a high-precision weight that is found to be below tolerance because of wear has to be either discarded or reclassified as a lower-class weight with a wider tolerance.

OBJECT OF THE INVENTION

It is therefore the object of the present invention, to provide a precision weight that meets all requirements of applicable standards but represents an improvement over state-of-the-art weights by offering a greater permanence of mass through greater surface hardness, greater wear and scratch resistance, and greater corrosion resistance than weights of the previously available state-of-the-art.

SUMMARY OF THE INVENTION

In accordance with the present invention, the foregoing objective can be met by providing a precision weight of austenitic stainless steel with a hardened surface layer. In a typical application, the weight may be of a type that meets a standard specification for precision weights, such as OIML Class $E_1$, $E_2$, $F_1$, $F_2$, or one of the ASTM Classes 0 to 3, but the present invention applies equally to weights that may be made to other standards or to custom specifications.

In preferred embodiments of the invention, the weight is made from a type of austenitic stainless steel that contains chromium and one or more transition metal elements such as nickel and/or manganese and at least one additional transition element such as molybdenum for increased corrosion resistance, and is free of ferrite as well as martensite. Examples of stainless steels with these preferred characteristics are UNS-S3xxxx and UNS-S2xxxx, where xxxx designates a 4-digit number, e.g., UNS-S30403, UNS-S31603, UNS-S32100, UNS-S28200. In the aforementioned Unified Numbering System (UNS) the S stands for stainless materials, the 3 for standard chromium-nickel austenitic steel and 2 for chromium-magnanese austenitic steel. The weight is formed from the raw material, e.g., by machining the prescribed shape from bar stock. Through a mechanical, chemical and/or electrochemical method of removing surface material from the raw piece, the weight is finished and adjusted so that its surface quality and mass value are already at least within preliminary tolerance limits before the weight is provided with the hardened surface layer.

Further in preferred embodiments of the invention, the hardened surface layer is the result of a heat treatment under a gas atmosphere containing, e.g., methane, ethane, ammonia or ethylene. Heat treatments of this kind are known, for example, under the technical terms "case hardening", "carbiding", "nitriding", "carbonitriding", "nitrocarbiding", "diffusion coating", and "diffusion layering". The heat treatment produces a diffusion layer of increased carbon and/or nitrogen concentration extending to a certain depth from the surface of the weight. The diffusing atoms should have smaller diameters than iron and they should preferably be interstitial to the crystal structure of the austenitic steel.

Preferred for a weight according to the invention is a heat treatment as described above, wherein the process temperature is lower than 350° Celsius, in order to prevent the formation of intermetallic compounds and/or precipitates which could cause corrosion and/or oxidation problems.

One proprietary heat treating process that falls in the aforementioned category is known under the trade names "Kolsterizing™" and/or "Kolsterisieren™" and/or "Kolsterisation™" and/or "Hardcor™". This process is owned by Hardiff BV, Surface Treatment Technology, 7333 PA Apeldoorn, Netherlands. A description is found, e.g., in "Anti-wear/corrosion treatment of finished austenitic stainless steel components: the Hardcor process", by R. H. van der Jagt, B. H. Kolster and M. W. H. Gillham, in Materials & Design, Vol. 12, No. 1, February 1991. The hardness of the layer obtained by this treatment is greatest at the outside surface and decreases gradually over a depth interval to the hardness level of the unmodified core material. The treatment causes a small increase in mass.

The manufacturing process of the weight can, under one embodiment of the invention, end with the heat treatment as described in the preceding paragraph. Other embodiments of the invention can include further steps for polishing and/or fine-adjusting the weight after it has been heat-treated. For example, the mass increase caused by the treatment could at this point be compensated by removing material evenly from the entire surface of the weight, if no corresponding allowance was made in the steps of finishing and adjusting the weight prior to the heat treatment.

As a result, a weight with a hardened surface layer according to the invention has a higher hardness, better wear and scratch resistance, as well as an increased resistance to corrosion, particularly to pitting.

Further details of the invention will become clear from the following description of embodiments that are illustrated in the drawings.

BRIEF DESCRIPTION OF THE DRAWING

FIG. 1 represents a typical precision weight of a kind that this invention relates to.

DETAILED DESCRIPTION OF THE PREFERRED EMBODIMENT

Figure 1:
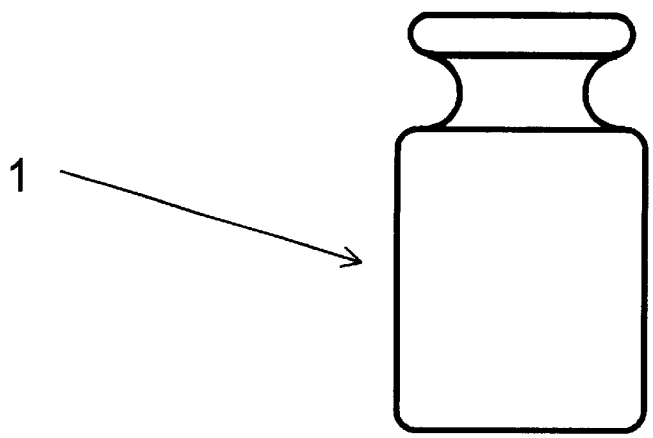

FIG. 1 represents a typical shape of a precision weight 1 as recommended, e.g., in the aforementioned standards OIML R 111 and ASTM 617. Typically, the invention will be embodied in weights meeting either one or both of these standards, but it is to be understood that the present invention applies equally to weights that may be made to other standards or to custom specifications, for example weights in the shape of disks, rings, or any arbitrary configurations that may be built into or used in conjunction with any kind of weighing or testing apparatus for mass, force, pressure, and other physical quantities.

Figure 2:
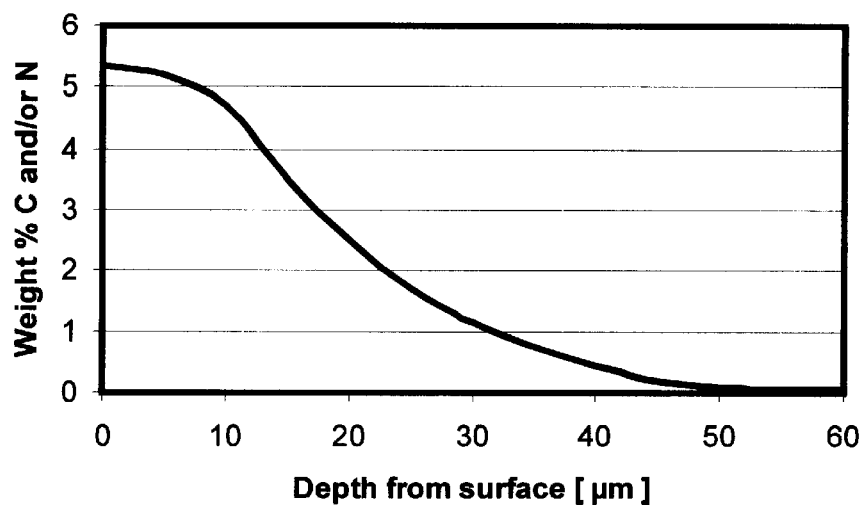
FIG. 2 represents the carbon and/or nitrogen concentration in a surface layer of a weight according to the invention as a function of depth.

The diagram of FIG. 2 illustrates the variation of the carbon and/or nitrogen concentration in % C and/or N as a function of the depth d in $\mu$m measured from the surface of the weight after it has bee heat-treated. The concentration at the surface is increased to a general order of magnitude of about 5–6%, while the level at the interior of the weight remains at the pre-treatment level of about 0.03%.

Figure 3:
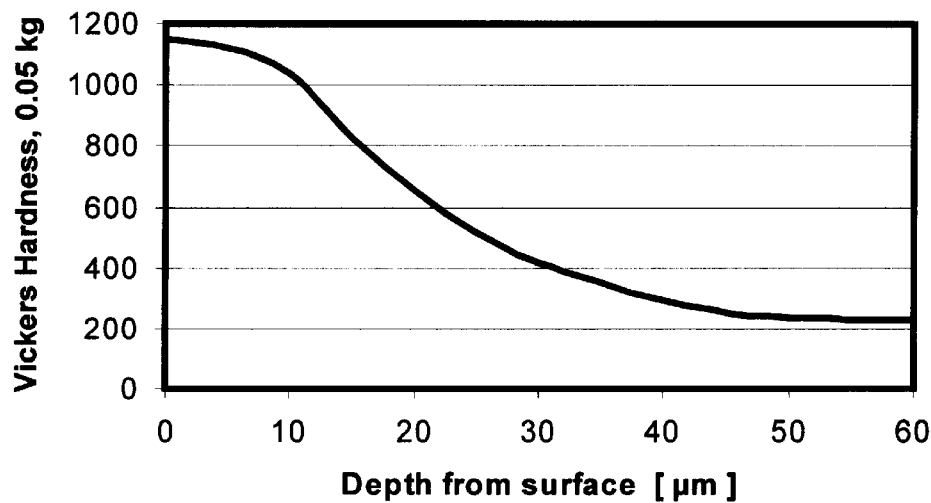
FIG. 3 represents the hardness as a function of depth in a surface layer of a weight according to the invention.

The diagram of FIG. 3 illustrates the variation of hardness vs. depth within the hardened surface layer of the weight according to the invention. At the outside surface, the weight has a Vickers (HV 0.05) hardness of between 1000 and 1200 which decreases gradually over a depth interval of about 5 to 50 $\mu$m to the hardness level of the unmodified core material, i.e., around 200. The treatment causes a mass increase of typically 1 mg per $cm^2$ of surface area. This additional mass could be compensated either in the initial machining and finishing or in a fine-adjusting and/or polishing step after the surface-hardening treatment, e.g., by removing material evenly from the entire surface of the weight to a depth of about 1.2 $\mu$m, or as much as required to bring the mass value of the weight within the applicable tolerance limits.

It is considered self-evident that within the scope and principal concepts of the invention, numerous embodiments of weights with hardened surfaces are possible, and also that any quantitative data such as hardness and layer thickness are meant only as examples and not as limitations.

What is claimed is:

1. A precision weight for performing at least one among a group of procedures consisting of:
   a calibration test of a weighing instrument,
   a calibration test of a measuring apparatus other than a weighing instrument,
   a calibration test of weights of a lower class of accuracy than said precision weight,
   a determination of a mass of an object on a weighing instrument, and
   a measurement of a physical quantity other than said determination of a mass,
wherein said weight comprises austenitic stainless steel, said weight further comprises a surface layer, and said surface layer is hardened.

2. The precision weight of claim 1, wherein the precision weight meets requirements applicable to weights as set forth in a standard published by at least one of the organizations including the Organisation Internationale de Metrologie Legale, the American Society for Testing and Materials, and the National Institute of Standards and Technology.

3. The precision weight of claim 1, wherein the precision weight is a built-in part of a device.

4. The precision weight of claim 1, wherein the austenitic stainless steel comprises chromium and at least one transition-metal element from a group consisting of nickel and manganese, and at least one further transition metal element that is not part of said group.

5. The precision weight of claim 4, wherein the at least one further transition metal element is molybdenum.

6. The precision weight of claim 1, wherein the austenitic stainless steel is ferrite free and martensite free.

7. The precision weight of claim 1, wherein the austenitic stainless steel belongs to a group that consists of the steel types UNS-S3xxxx or UNS-S2xxxx, where xxxx designates a 4-digit number.

8. The precision weight of claim 1, wherein the hardened surface layer is a diffusion layer with an increased concentration of at least one of the elements carbon and nitrogen, said increased concentration resulting from a heat treatment under a gas atmosphere.

9. The precision weight of claim 8, wherein a process temperature of less than 350° Celsius is employed in said heat treatment.

10. The precision weight of claim 8, wherein said heat treatment comprises a diffusion of atoms into the surface layer and the diffused atoms have smaller diameters than iron atoms.

11. The precision weight of claim 10, wherein the surface layer has a crystal structure and the diffused atoms are interstitial to said crystal structure.

12. The precision weight of claim 8, wherein the gas atmosphere comprises at least one gas from the group that consists of methane, ethane, ammonia, and ethylene.

13. The precision weight of claim 1, wherein the hardened surface layer has a depth of an order of magnitude of 5 to 50 micron.

14. The precision weight of claim 1, wherein the hardened surface layer has an outside surface hardness of an order of magnitude of 1000 to 1200 in a Vickers hardness HV 0.05 test.

15. A process for making the precision weight of claim 1, comprising the steps of:

forming the precision weight from raw material stock consisting of the austenitic stainless steel;

finishing the surface to meet at least a preliminary surface finish tolerance;

adjusting the precision weight by removing material from the surface to meet at least a preliminary mass tolerance; and heat-treating the precision weight under a gas atmosphere.

16. The process of claim 15, further comprising the step of polishing the surface to meet a final surface finish tolerance, wherein said polishing step occurs after the heat-treating step.

17. The process of claim 15, further comprising the step of fine-adjusting the precision weight by removing material from the surface to meet a final mass tolerance, wherein said fine-adjusting step occurs after the heat treating step.

18. The process of claim 15, wherein a process temperature of less than 350° Celsius is employed in the heat-treating step.

19. The process of claim 15, wherein the gas atmosphere comprises at least one gas from the group that consists of methane, ethane, ammonia, and ethylene.

* * * * *